US010855389B1

(12) United States Patent
Roggendorf et al.

(10) Patent No.: US 10,855,389 B1
(45) Date of Patent: Dec. 1, 2020

(54) MODIFIED TIME DIVISION MULTIPLE ACCESS (TDMA) NETWORK

(71) Applicant: Rockwell Collins, Inc., Cedar Rapids, IA (US)

(72) Inventors: Brian R. Roggendorf, Marion, IA (US); John C. Herder, Cedar Rapids, IA (US); Jonathon C. Skarphol, Robins, IA (US); Carlen R. Welty, Solon, IA (US); Jobe D. Price, North Liberty, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/527,657

(22) Filed: Jul. 31, 2019

(51) Int. Cl.
| | |
|---|---|
| *H04W 84/18* | (2009.01) |
| *H04J 3/16* | (2006.01) |
| *H04J 3/06* | (2006.01) |
| *H04L 12/733* | (2013.01) |
| *H04L 12/24* | (2006.01) |

(52) U.S. Cl.
CPC .......... *H04J 3/1694* (2013.01); *H04J 3/0647* (2013.01); *H04L 41/12* (2013.01); *H04L 45/20* (2013.01)

(58) Field of Classification Search
None
See application file for complete search history.

(56) References Cited

U.S. PATENT DOCUMENTS

| 15,236,180 | 8/2016 | Roggendorf |
| 10,701,654 B1 | 6/2020 | Roggendorf et al. |

| 2007/0019594 A1* | 1/2007 | Perumal | H04W 40/24 370/338 |
| 2009/0300379 A1* | 12/2009 | Mian | G01D 9/005 713/300 |
| 2012/0236724 A1* | 9/2012 | Rudnick | H04W 40/30 370/236 |
| 2019/0261215 A1* | 8/2019 | Engelen | H04W 28/0289 |

OTHER PUBLICATIONS

Extended EP Search Report dated Jun. 23, 2020 for EP Application No. 19215779.
Alshudukhi, Jalawai et al., "A MAC protocol for wireless ensors in a fixed chain topology", 2016 Asia Pacific Conference on Multimedia and Broadcasting (APMEDIACAST), IEEE, Nov. 17, 2016, pp. 29-35.
Fan, Yu et al., "Routing with Minimized Slot Misordering for Delay Mitigation in TDMA based Sensor Networks", Networking and Services, 2007, ICNS, Third International Conference, IEEE, PI, Jun. 1, 2007, p. 58.

\* cited by examiner

*Primary Examiner* — Ayanah S George
(74) *Attorney, Agent, or Firm* — Suiter Swantz pc llo

(57) ABSTRACT

A system and a method. The system may include a node of a network of nodes, wherein the network is configured as a modified time division multiple access (TDMA) network. The node may include a processor and a transceiver communicatively coupled to the processor. The processor may be configured to: collect data received from each other node of the network during a data collection phase of a given modified TDMA cycle, the collected data including information of connectivity between pairs of nodes of the network; and output the collected data for transmission to each other node of the network during a data distribution phase of the given modified TDMA cycle.

15 Claims, 11 Drawing Sheets

500

502 Receiving, via a Transceiver of a First Communications Node of a Plurality of Communications Nodes, from a Second Communications Node of the Plurality of Communications Nodes, a Transmission Sequence Generated According to a Communications Cost Value Determined for Each Pair of the Communications Nodes, the Transmission Sequence Specifying a Third Communications Node Followed by the First Communications Node as Consecutive Nodes for Transmitting Packets

504 Receiving, via the Transceiver, One or More Packets Transmitted by the Third Communications Node According to the Transmission Sequence

506 Detecting, by a Sequence Manager of the First Communications Node, that Reception of a Terminal Packet of the One or More Packets from the Third Communications Node Has or Should Have Just Completed

508 Initiating, by the Sequence Manager, Transmission by the Transceiver Immediately upon the Detection

FIG. 5

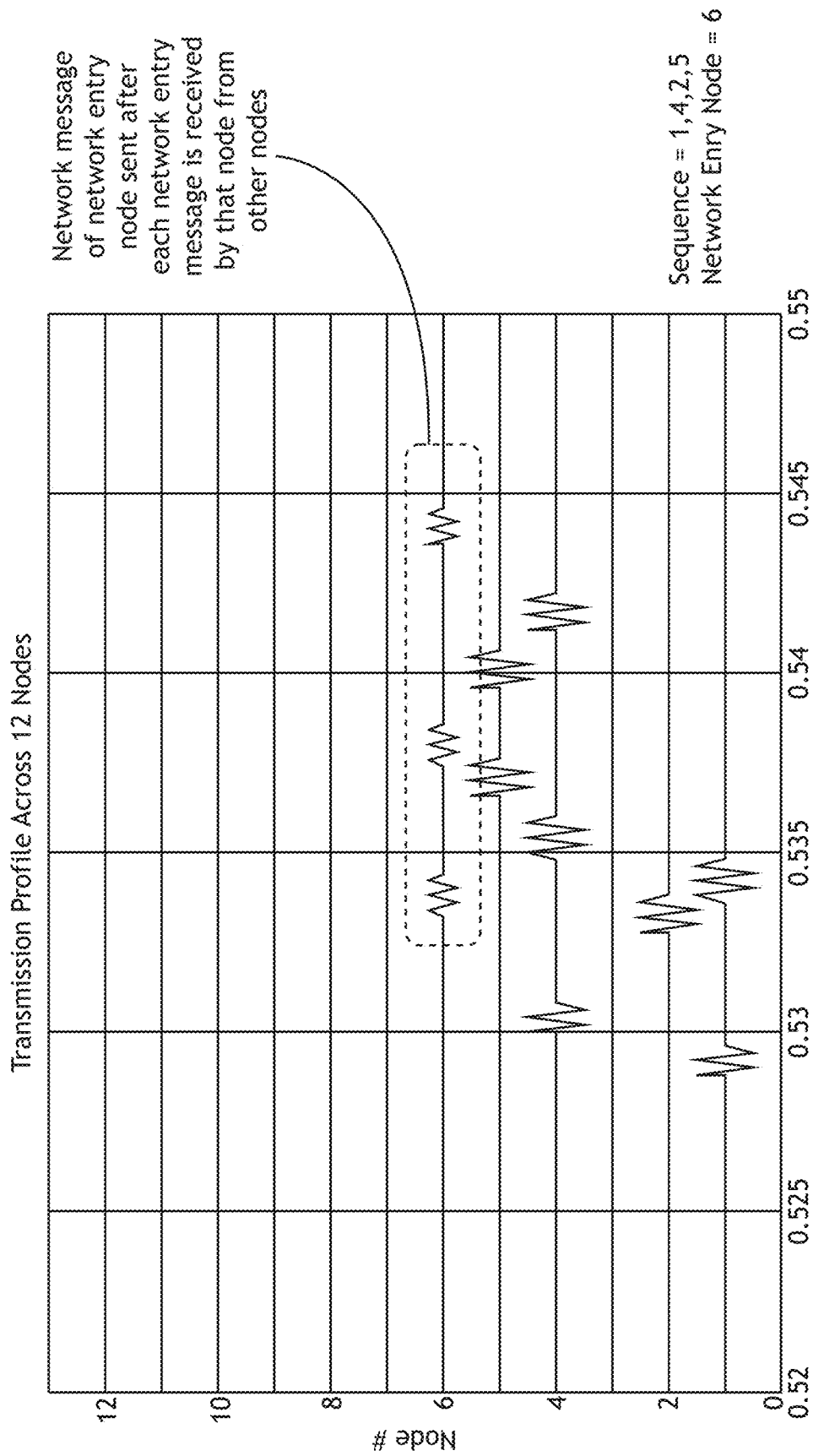

MODIFIED TIME DIVISION MULTIPLE ACCESS (TDMA) NETWORK

CROSS-REFERENCE TO RELATED APPLICATIONS

The present application is related to U.S. application Ser. No. 15/236,180, filed Aug. 12, 2016. U.S. application Ser. No. 15/236,180 is herein incorporated by reference in its entirety.

BACKGROUND

Multiple communications nodes in networked environment may coordinate the transmission of data packets within a frequency channel using time division multiple access (TDMA). Under TDMA, each of the nodes may be assigned a time slot within which the node may broadcast or transmit packets to the other nodes of the network. No other nodes may transmit at the same time slot as another node. Since the propagation speed of transmissions is limited by the speed of light, the arrival time of the packets at each node may differ, with some nodes receiving the same packet at a much later time than other nodes. Because of this, the nodes that receive the packets earlier in time may wait a significant amount of time before receiving the next transmission. As such, time slot allocations may be implemented to accommodate and be fixed to when the last node within the network receives the packets. Due to the accommodation, the frequency channel capacity may be underutilized, thereby reducing the total effective network capacity. The reduction in the total effective network capacity may be exacerbated, if the time slots are lengthened to accommodate peak time demand, since some nodes may transmit data packets much shorter than the allocated time slot. Overcoming these technical challenges would allow for improved utilization of the frequency channel and increased effective total network capacity.

Currently implemented large airborne networks lack the ability for each node to have identical information while assuring delivery to many recipients with low latency.

SUMMARY

In one aspect, embodiments of the inventive concepts disclosed herein are directed to a system for managing network communications. The system may include a node of a network of nodes. The network may be configured as a modified time division multiple access (TDMA) network. The modified TDMA network may allow for one node of the network at a time for a given frequency to transmit to other nodes of the network. The modified TDMA network may lack predefined synchronized slot boundaries that would otherwise define transmit allocation intervals. The modified TDMA network may lack a predefined allocation of a number of slots for each node per cycle. The modified TDMA may utilize a transmitted sequence indicating an order in which each node of the network is to transmit. The modified TDMA may utilize packets each transmitted with a counter indicating a number of remaining packets from a particular node. When the counter reaches a terminal value, a subsequent node in the sequence may be allowed to transmit. The node may include a processor and a transceiver communicatively coupled to the processor. The processor may be configured to: collect data received from each other node of the network during a data collection phase of a given modified TDMA cycle, the collected data including information of connectivity between pairs of nodes of the network; and output the collected data for transmission to each other node of the network during a data distribution phase of the given modified TDMA cycle.

In a further aspect, embodiments of the inventive concepts disclosed herein are directed to a method for managing network communications. The method may include collecting, by a processor of a node, data received from each other node of a network during a data collection phase of a given modified time division multiple access (TDMA) cycle, the collected data including information of connectivity between pairs of nodes of the network. The method may also include outputting, by the processor, the collected data for transmission to each other node of the network during a data distribution phase of the given modified TDMA cycle. The network may be configured as a modified TDMA network. The modified TDMA network may allow for one node of the network at a time for a given frequency to transmit to other nodes of the network. The modified TDMA network may lack predefined synchronized slot boundaries that would otherwise define transmit allocation intervals. The modified TDMA network may lack a predefined allocation of a number of slots for each node per cycle. The modified TDMA may utilize a transmitted sequence indicating an order in which each node of the network is to transmit. The modified TDMA may utilize packets each transmitted with a counter indicating a number of remaining packets from a particular node. When the counter reaches a terminal value, a subsequent node in the sequence may be allowed to transmit. The node may include the processor and a transceiver communicatively coupled to the processor.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5 shows a flow diagram of an example embodiment of a method for managing network communications, in accordance with some embodiments of the inventive concepts disclosed herein.

FIG. 6 is an exemplary graph illustrating network ingress of a network entry node into the network of nodes according to inventive concepts disclosed herein.

DETAILED DESCRIPTION

Figure 1:
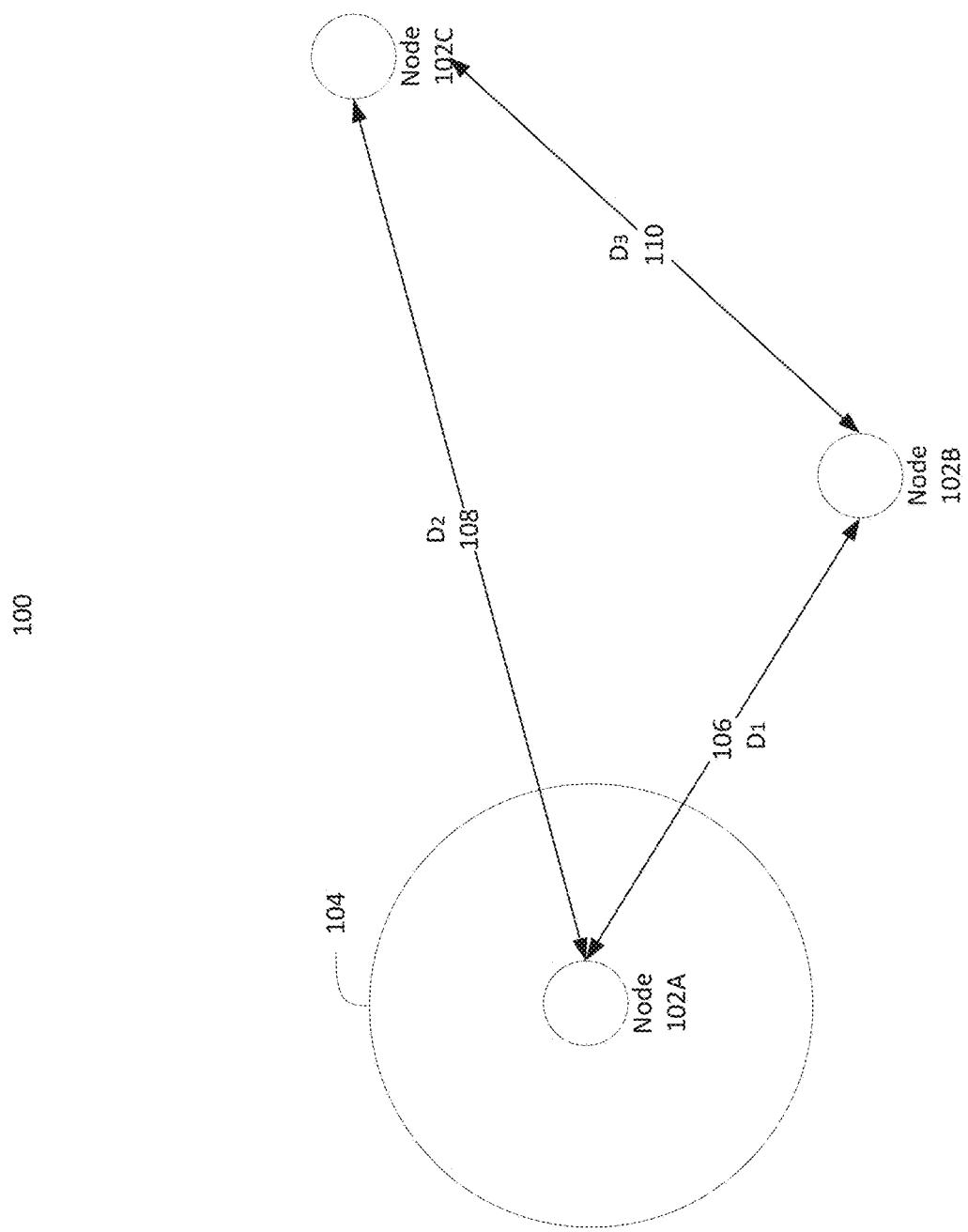
FIG. 1 is a block diagram of an example embodiment of a system for managing network communications, in accordance with some embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system including a node of network configured to collect data of all other nodes in the network and distribute the collected data to all other nodes of the network.

Some embodiments of the inventive concepts disclosed herein are directed to a system of managing network communications. In a network environment, multiple communications nodes may communicate with one another on a frequency channel for instance, and may coordinate transmission of data with the frequency channel using TDMA-based time slot allocation. To leverage on at least some of the free air time between transmission of a packet by one node and receipt of the packet by all the other nodes in the network, the nodes may coordinate resource allocations (e.g., transmission time and/or packet length) of transmissions of data packets using a transmission sequence. The transmission sequence may specify the order in which the nodes of the network may transmit. The transmission sequence may allow for immediate, successive transmissions of packets by the node which is next closest in transmission distance (or communications cost value) to that of the previously transmitting node, subsequent to receiving all of the packets from the previously transmitting node. For example, the transmission sequence may specify an order of transmission for the nodes such that if a token is transmitted along a corresponding plurality of nodes in that order, the overall transmission path length or time (or other communications cost value) may be minimized. The transmission sequence may be generated by any one of the nodes based on a communications cost value for transmitting packets from one node to another node in the network. Each communications cost value may be calculated using various parameters, such as distance, transmission strength, and receive sensitivity, among others among the multiple communications nodes of the network. The transmission sequence may correspond to the minimum sum of the communications cost values and may also correspond to the optimal order of transmission among the nodes. Once distributed, the communications nodes may follow the transmission sequence to transmit data packets may in accordance with the transmission sequence. Because each of the communications nodes may transmit, immediately and successively after receiving the data packets from the previously transmitting node, utilization of allocated capacity (e.g., resources of a frequency channel) may be improved, thereby increasing the effective total network capacity.

Some embodiments may include a network that utilizes a modified TDMA (e.g., a token-based TDMA), whereby time slots are not fixed but rather sequenced as transmissions occur to minimize dead air time.

For example, one node (e.g., a network reference node) of the many network nodes may initiate a token-based TDMA sequence to collect information from the other nodes. This phase is called a "data collection" phase. Upon receiving all data, that same node may initiate a "data distribution" phase. This may be repeated either cyclically (e.g., multiple Hertz (Hz)) or immediately upon completion of a previous cycle.

For example, rather than listing all potential nodes in the token sequence and having network capacity go unused, a network entry method may be utilized, whereby the network reference node may identify at least one node (e.g., a single node) within any given cycle that is able to enter the network. The entry node may be given an opportunity to transmit at a specified time within the sequence either on a primary or alternate frequency. By rotating through nodes that are not in the network, each node may be able to ingress into the network relatively quickly.

For example, since connectivity between any two airborne nodes can change quickly, it is desired that the connectivity between each pair of nodes be uniquely determined in each cycle during the data collection phase. Each node may report a list of nodes from which it has recently received data from in a network message. Using this connectivity information received for every other node, each transmitting node may be able to identify any number of relay nodes so that the probability of reception across all nodes is high. This may include redundant relays to increase that probability. The relayer information may be included in the transmission of each message so that receivers of these messages that are in the TDMA token sequence can account for the relay transmissions in calculating when they should transmit. The relay transmissions may be transmitted immediately after the original transmission to reduce latency across the network while the TDMA token is "owned" by the original author of the message.

For example, after information is received by the network reference node, a distribution phase may be entered. The same relay methodology described above may be used to distribute the data set to each node. Because the token-based TDMA approach may include a "countdown" identifier on each message transmitted, each recipient may be able to detect missing information and request re-transmission of each message.

For example, once the common message set is delivered to each node, each node can process the data and be assured that it is consistent with other nodes on the network.

Some embodiments may be implemented as a large airborne network (e.g., dozens of nodes) with the ability for each node to have identical information while assuring delivery to many recipients with low latency (e.g., measured in a fraction of a second).

Referring to FIG. 1, one example embodiment of a system 100 for managing network communications is depicted. The system 100 may correspond to a network environment that may include any number of communications nodes 102A-N. In the example illustrated in FIG. 1, there are three communications nodes, a first communications node 102A, a second communications node 102B, and a third communications node 102C, although the inventive concepts disclosed herein are not limited to any particular number of nodes. Each of the communications node 102A-N may include any form or type of computing device with communications capabilities and may be mobile or stationary. For example, a communications node 102A-N may include but not limited to a laptop, desktop computer, cellular/smart phone, tablet, vehicle (e.g., aircraft, automobile, watercraft, and spacecraft), robotic device, household/office/military appliance or device, satellite, or pseudolite.

In the network environment of system 100, each of the communications node 102A-N may transmit data packets to, and may receive data packets from, all of other communications nodes 102A-N in the group of nodes 102A-N and/or a given frequency channel for instance. The propagation distance of transmitted packets may differ among the communications nodes. As such, when a communications node 102A-N transmits a data packet, the wave front 104 of the signal carrying the data packet may arrive at different times at different communications nodes 102A-N. In the example depicted in FIG. 1, the propagation distance 106 between the first communications node 102A and the second communications node 102B may be D_1, the propagation distance 106 between the first communications node 102A and the third communications node 102C may be D_2, and the propagation distance 106 between the second communications node 102B and the third communications node 102C may be D_3. The propagation distance 106 may be less than the propagation distance 108 (D_1<D_2). Further, the propagation distance 110 may be less than the propagation distance 110 (D_3<D_2). In this example, when the first communications node 102A transmits a data packet to all the other communications nodes in the network environment of system 100, the wave front 104 of the signal carrying the data packet may arrive at the second communications node 102B prior to arriving at the third communications node 102C. As such, there may be some free time in the frequency channel between the first communications node 102A and the second communications node 102B, prior to the arrival of the data packet at the third communications node 102C. Using a transmission sequence, the communications nodes 102A-N may interoperate with one another and leverage the difference in arrival times of the wave front 104 carrying the data packet from one communications node 102A-N to all the other communications node.

Figure 2:
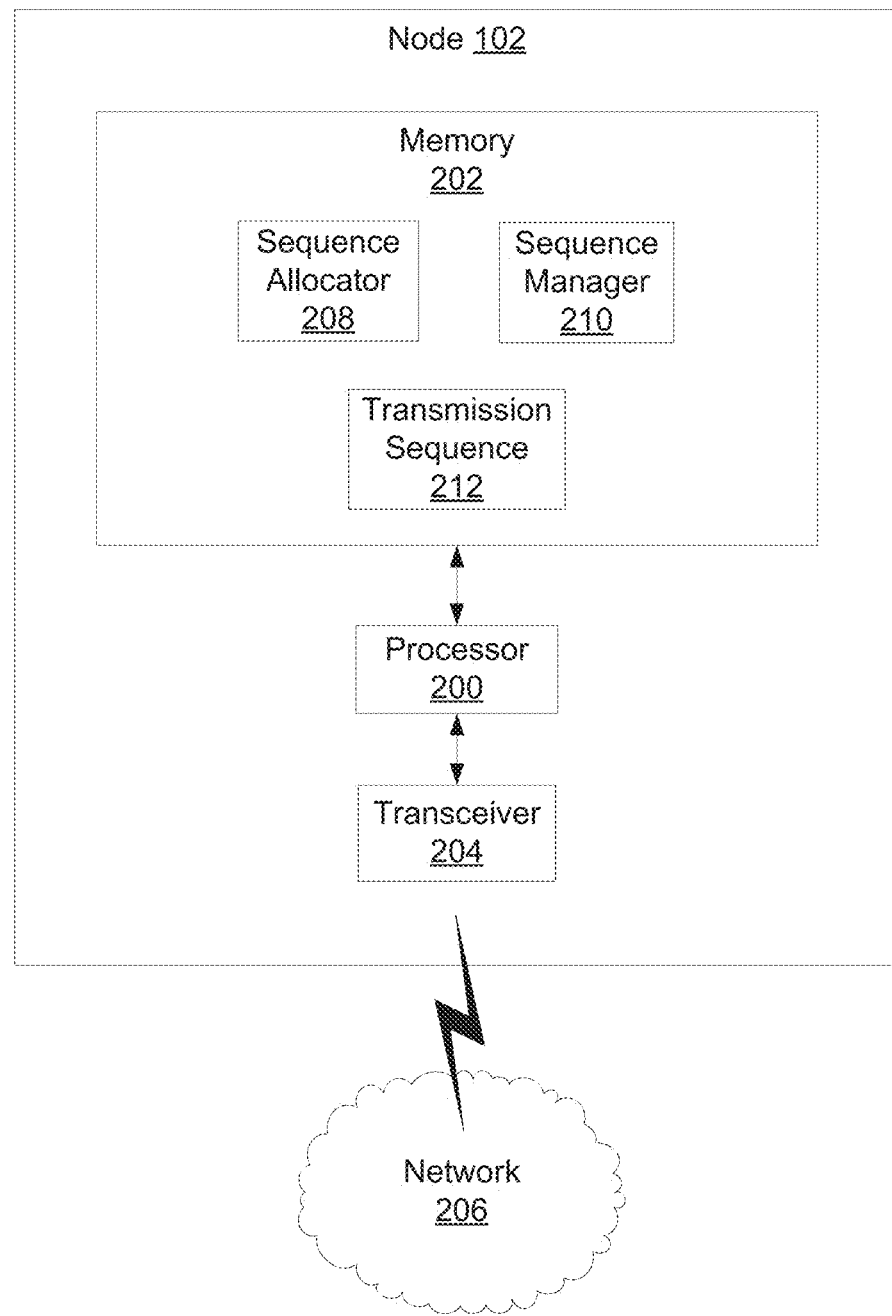
FIG. 2 shows a block diagram of an example embodiment of an architecture for communications nodes in a network environment of a system for managing network communications, in accordance with some embodiments of the inventive concepts disclosed herein.

Referring now to FIG. 2, an example embodiment of architectures for communications nodes 102A-N of the network in the system 100 for managing network communications is depicted. Each communications node 102 may include a processor 200, memory 202, and a transceiver 204, and be in communications with a network 206. The processor 200 may include a microprocessor unit, an application-specific integrated circuit (ASIC), and a field-programmable gate array (FPGA), among others. In some embodiments, the processor 202 may include a multi-core processor or an array of processors. The processor 202 may execute the programmable instructions stored on the memory 202, such as a sequence allocator 208 and a sequence manager 210. In some embodiments, the memory 202 may store or maintain a transmission sequence 212. The memory 202 may include electronic, optical, magnetic, or any other storage device capable of relaying or providing the processor 200 with program instructions, such as the sequence allocator 208, the sequence manager 210, and the transmission sequence 212. The transceiver 204 may include a transmitter to transmit data one or more packets to other communications nodes 102A-N via the network 206, and a receiver to receive one or more packets from the other communications nodes 102A-N via the network 206. The transmitter and the receiver of the transceiver 204 may include a built-in adapter, a wireless network adapter, universal serial bus (USB) network adapter, modem, or any other device capable of interfacing with the one or more other communications nodes 102A-N via the network 206 through a variety of connections. The network 206 may include other communications nodes 102A-N of the network environment of system 100.

To generate the transmission sequence 212, the sequence allocator 208 may determine or otherwise calculate a communications cost value for each pair of communications nodes 102A-N to communicate with each other via the network 206. The communications cost value may be indicative of a path-cost or a distance metric of transmitting one or more packets by one communications node 102A-N to the another communications node 102A-N. In some embodiments, the determination of the communications cost value may be determined by, or assigned or conveyed to one of the communications nodes 102A-N connected to the network 206. For example, one of the communications node 102A-N may be designated as a master communications node for calculating and/or distributing the communications cost value. In some embodiments, the determination of the communications cost value may be performed by at least a subset of the communications nodes 102A-N connected to the network 206. The communications nodes 102A-N that determine the communications cost value may directly or indirectly distribute or broadcast the respective determined communications cost value to the other communications nodes 102A-N.

In some embodiments, the communications cost value for each pair of communications nodes 102A-N may be bidirectional. For example, there may be a single communications cost value associated transmitting one or more packets between a first communications node 102A and a second communications node 102B. In some embodiments, the communications cost value for each pair of communications nodes 102A-N may be unidirectional. For example, there may be one communications cost value associated with the first communications node 102A transmitting one or more packets to a second communications node 102B and another communications cost value associated with the second communications node 102B transmitting one or more packets to the first communications node 102A. The communications cost value may change in time, for instance as a corresponding communications node 102 changes in location or priority relative to one or more other nodes.

The sequence allocator 208 may identify any number of factors to use in determining the communications cost value. The factors may generally relate to communication of one or more packets between a corresponding pair of communications nodes 102A-N. In some embodiments, the sequence allocator 208 may determine the communications cost value according to a distance between the corresponding pair of communications nodes 102A-N (e.g., propagation distances 106, 108, and 110). The distance may correspond to the propagation distance between the corresponding pair of communications nodes 102A-N. In some embodiments, the sequence allocator 208 may identify a location of each of the communications nodes 102A-N and may calculate a relative distance (e.g., Euclidean distance) between each corresponding pair of communications nodes 102A-N. In some embodiments, the sequence allocator 208 may determine the communications cost value according to a measured line of sight or a probability of line-of-sight between the corresponding pair of communications nodes 102A-N. The probability of line-of-sight may take into account diffractions, refractions, reflections, absorptions, or any other effects from the network environment on the wave front 104 of the signal carrying the transmission of the one or more packets from one communications node 102A-N to the other communications node 102A-N.

The factors used in determining the communications cost value may also include characteristics of the individual communications node 102A-N. In some embodiments, the sequence allocator 208 may identify characteristic information of each of the communications nodes 102A-N connected to the network 206. The characteristic information may include a transmission strength, a receiver sensitivity, an altitude, or a signal-to-noise ratio (SNR). In some embodiments, the sequence allocator 208 may receive characteristic information from each of the communications node 102A-N. Characteristic information may include the transmission strength, the receiver sensitivity, the altitude, or the SNR of the respective communications node 102A-N. In some embodiments, the sequence allocator 208 may determine, adjust and/or weigh the determined communications costs value for the corresponding communications node 102A-N based on one of the characteristic information for at least one of the communications node 102A-N.

In some embodiments, the sequence allocator 208 may determine the communications cost value according to the transmission strength of at least one communications node 102A-N in the corresponding pair of communications nodes 102A-N. The transmission strength may also be referred to as field strength or signal strength, and may be indicative of the transmitter power output of the transmitter of the respective communications node 102A-N. For example, the transmission strength of some communications nodes 102A-N connected to the network 206 may different that of other communications nodes 102A-N. The communications cost value of communications nodes 102A-N with weaker transmission strengths may be higher than those communications nodes 102A-N with stronger transmission strengths, allowing the communications nodes 102A-N with stronger transmissions strengths to communicate or repeat the one or more packets of the communications nodes 102A-N with lower transmission levels. In some embodiments, the sequence allocator 208 may determine the communications cost value according to the receiver sensitivity of at least one communications node 102A-N in the corresponding pair of communications nodes 102A-N. The receiver sensitivity may correspond to the minimum strength of the signal carrying the one or more packets detectable and/or that can be processed by the respective communications node 102A-N.

In some embodiments, the sequence allocator 208 may determine the communications cost value according to the altitude of the at least one of communications node 102A-N in the corresponding pair of communications nodes 102A-N. The altitude may correspond to the height or depth location of the respective communications node 102A-N, relative to a reference (e.g., sea or ground level). In some embodiments, the sequence allocator 208 may determine the communications cost value according to the SNR of the at least one of communications node 102A-N in the corresponding pair of communications nodes 102A-N. The SNR may be measured by each communications node 102A-N using the transmission strength and a background noise strength.

The factors used in determining the communications cost value may include a priority of the one or more packets to be transmitted by the respective communications node 102A-N. The priority may indicate a measure of importance, service level and/or urgency of information in the one or more packets to be transmitted by the individual communications node 102A-N. The priority may also indicate a measure of importance, service level and/or urgency of the communication between a corresponding pair of communications nodes 102A-N. In some embodiments, the sequence allocator 208 may determine the communications cost value according to the priority of the at least one of communications node 102A-N in the corresponding pair of communications nodes 102A-N. In some embodiments, the sequence allocator 208 may determine, adjust and/or weight the determined communications cost value by the priority of the one or more packets to be transmitted by the respective communications node 102A-N. If the priority of the one or more packets to be transmitted by the respective communications node 102A-N is low relative to that of at least another node or to a predetermined reference, the sequence allocator 208 may increase the determined communications cost value of the respective communications node 102A-N transmitting to the other communications nodes 102A-N. If the priority of the one or more packets to be transmitted by the respective communications node 102A-N is high relative to that of at least another node or to a predetermined reference, the sequence allocator 208 may decrease the determined communications cost value of the respective communications node 102A-N transmitting with the other communications nodes 102A-N.

In some embodiments, the sequence allocator 208 may compare the priority for the respective communications node 102A-N to a predefined threshold. In some embodiments, the sequence allocator 208 may determine, weight and/or adjust the determined communications cost value for the corresponding pair of communications node 102A-N based on the comparison of the priority with the predefined threshold. For example, if the priority of the one or more packets is determined to be above the predefined threshold, indicating high importance for instance, the sequence allocator 208 may set the determined communications cost value of the respective communications node 102A-N transmitting with the other communications nodes 102A-N to null for example. If the priority of the one or more packets is determined to be below the second predefined threshold, indicating low importance for instance, the sequence allocator 208 may set the determined communications cost value of the respective communications node 102A-N transmitting with the other communications nodes 102A-N to increase the communications cost value by a multiplicative factor.

The sequence allocator 208 may generate the transmission sequence 212 based on the communication cost value determined for each pair of the communications nodes 102A-N. The transmission sequence 212 may be a data structure, such as an array, table, matrix, linked list, ordered list, heap, binary tree, and skip list, among others. The transmission sequence 212 may specify an order of transmission (or "token") for the communications nodes 102A-N in the network 206. The order of transmission may include having one communications node followed by the next communications node 102A-N as consecutive nodes to transmit one or more packets. The transmission sequence 212 may allow the communications nodes 102A-N in the network 208 to successively transmit packets by one communications node 102A-N after another communications node 102A-N within a single transmission frame or a repeatable cycle amongst the nodes 102A-N. The transmission frame may correspond to an amount of time to cycle through transmissions of packets by each of the communications nodes 102A-N. To determine the order of transmission for the transmission sequence 212, the sequence allocator 208 may identify a minimum or optimal sum of communication cost values spanning the communications nodes 102A-N in the network 206. The minimum or optimal sum of the communications cost value may be to minimize or optimize loss of network capacity to signal propagation, and may yield the shortest (or shortest average) travel distance or cost from one communications node 102A-N to another communications node 102A-N.

In some embodiments, the sequence allocator 208 may generate any type or form of a graph, model, representation or transmission sequence tree (hereafter generally referred to as a graph), including the communications cost values and the corresponding pair of communications nodes 102A-N. Each edge of the graph may correspond to the communications costs value and each node of the graph may correspond to one of the communications nodes 102A-N. The edges of the graph may be bidirectional or unidirectional. In some embodiments, the sequence allocator 208 may determine one or more paths through the graph that traverse all of the nodes. In some embodiments, the sequence allocator 208 may identify an optimal path from the one or more paths corresponding to the minimum or optimal sum of communications cost values through the graph. The optimal path may include a sequence of nodes through edges with the minimum or optimal sum of communications cost value. In some embodiments, the sequence allocator 208 may identify the order of transmission for the transmission sequence from the optimal path through the edges and nodes of the graph.

Figure 3:
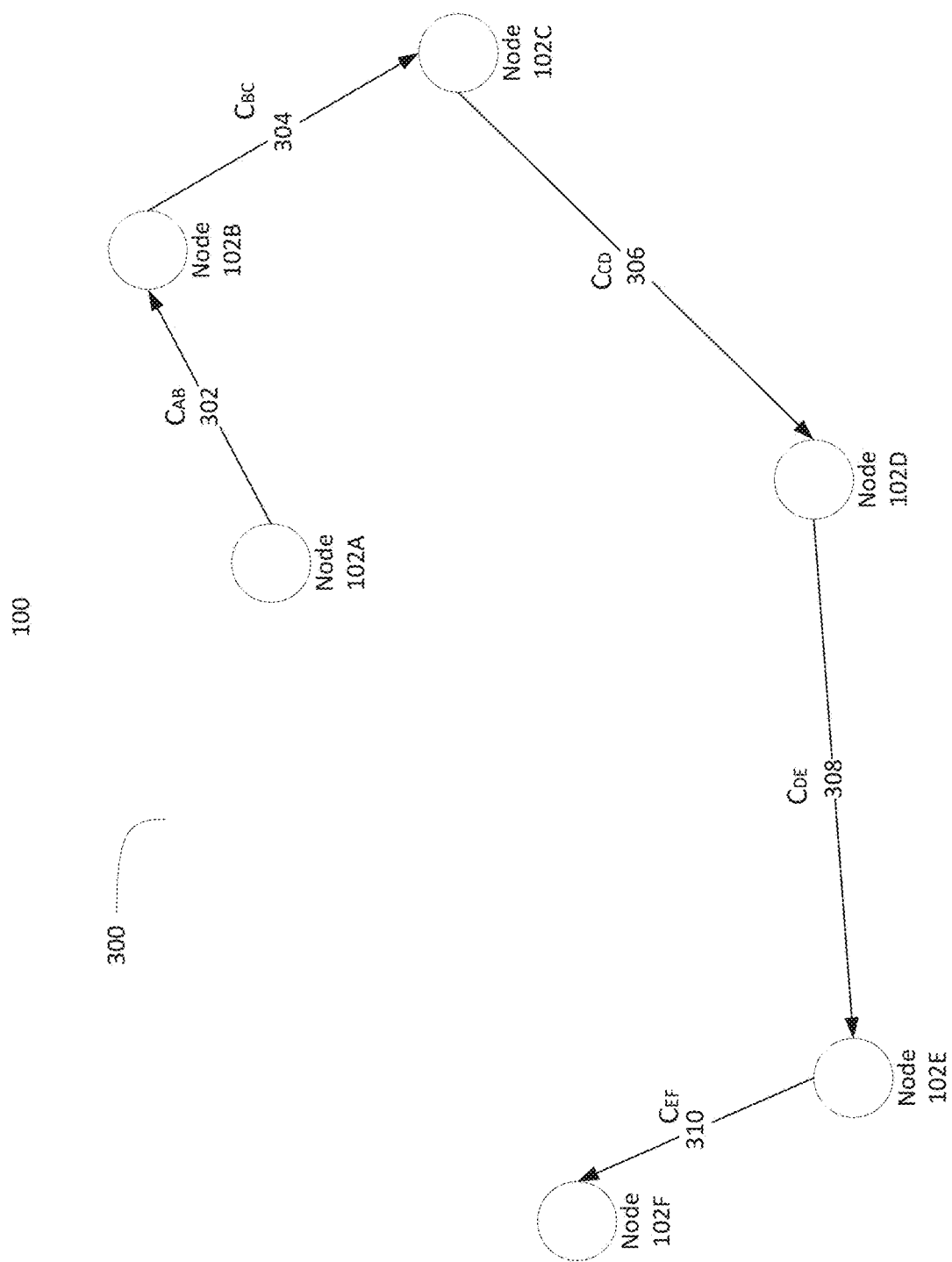
FIG. 3 shows a block diagram of another example embodiment of a system for managing network communications, in accordance with some embodiments of the inventive concepts disclosed herein.

Referring now to FIG. 3, depicted is one embodiment of a system 100 for managing network communications. One communications node 102A may identify a transmission sequence (e.g., corresponding to an optimal order of transmission 300 across the communications node 102B-F of the network 206), in accordance with some embodiments of the inventive concepts disclosed herein. In the example depicted in FIG. 3, the network environment of system 100 may include six communications nodes 102A-F with the optimal order of transmission 300 identified between the corresponding pairs of communications nodes 102A-F. In the context of FIG. 2, the sequence allocator 208 may have generated a graph with nodes and edges. Each node may represent a respective communications node 102A-F. Each edge may connect all of the nodes to one another and may represent a unidirectional communications cost value for transmitting one or more packets between the corresponding pair of communications nodes 102A-F. Using a dynamic programming algorithm (e.g., Dijkstra's algorithm, Greedy algorithm, depth-first search, Kruskal's algorithm, etc.), the sequence allocator 208 may have identified, determined or calculated an optimal path with the lowest sum of communications cost values through the graph. The optimal path identified from the graph may correspond to the optimal order of transmission 300. In the example here, the lowest sum of communications cost values may be the sum of the costs 302 (C_AB), 304 (C_BC), 306 (C_CD), 308 (C_DE), and 310 (C_EF). The optimal order of transmission 300 identified using the graph may be from first to last: the first communications node 102A, the second communications node 102B, the third communications node 102C, the third communications node 102D, the fourth communications node 102D, the fifth communications node 102E, and then the sixth communications node 102F. The sequence allocator 208 may generate the transmission sequence 212 using the optimal order of transmission 300 identified from the graph.

Referring back to FIG. 2, in some embodiments, the transmission sequence 212 may include a transmission length allocated for each transmission of the one or more communications nodes 102A-N. The transmission length may specify an amount of time for the respective communications node 102A-N to transmit to the one or more packets to the other communications nodes 102A-N. In some embodiments, the sequence allocator 208 may identify a number of the one or more packets to be transmitted by each of the communications nodes 102A-N in the network 206. In some embodiments, the sequence allocator 208 may set the transmission length allocated for each transmission based on the number of one or more outgoing/transmission packets identified or expected for each communications node 102A-N. For example, each packet may correspond to a fixed amount of time. The sequence allocator 208 may for instance multiply the number of the one or more packets to be transmitted by the fixed amount of time, to provide the transmission length for a corresponding communications node.

In some embodiments, the sequence allocator 208 may set a maximum transmission length for each transmission of packets by each communications node 102A-N. The maximum transmission length may specify a maximum number of packets permitted to be transmitted by each communications node 102A-N within the single transmission frame of the transmission sequence 212. In certain embodiments, a communications node specified with a maximum transmission length may transmit any number of packets up to the maximum transmission length. If the communications node transmits less than the maximum transmission length, a next communications node in the transmission sequence may detect for complete reception of the transmitted nodes, and may itself begin or perform transmission immediately upon reception of all the transmitted nodes. In some embodiments, the sequence allocator may determine the transmission sequence at the beginning of each frame, allowing the sequence to be dynamic rather than predetermined. The sequence allocator 208 may specify a hold-off interval based on the maximum number of transmissions. This hold-off interval may start from the reception of the transmission of the previous node, to deal with the case where a node may be otherwise unable to receive from the prior node. This hold-off interval may accommodate communications nodes 102A-N outside the transmission range of the communications node 102A-N transmitting the one or more packets for instance. For example, the third communications node 102C may be outside the transmission range of the first communications node 102A, but the second communications node 102B may be. In this scenario, in the time between receipt of the packets from the first communications node 102A and receipt of packets from another communications node provided by the maximum transmission length, the second communications node 102B may transmit the received packets to the third communications node 102C. In some embodiments, the sequence allocator 208 may set a minimum transmission length for each transmission of packets by each communications node 102A-N. The minimum transmission length may specify a minimum number of packets permitted to be transmitted by each of the communications nodes 102A-N. The minimum transmission length may indicate that a communications node that is next in the transmission sequence cannot begin transmission before that minimum number of packets is received from the prior communications node in the transmission sequence, or before that minimum transmission length has elapsed beginning from the first received packet.

In some embodiments, the sequence allocator 208 may allocate or set the transmission length according to a network capacity allocated to a subset of the communications nodes 102A-N. For example, different portions of a network's total capacity may be allocated to different groups or subsets of communications nodes in the network, or allocated to respective sequence allocators for managing network communications of the corresponding groups or subsets of communications nodes. The network capacity may correspond to a total number of packets that may be transmitted by at least some of the communications nodes 102A-N in the frequency channel for the network 206 in the transmission frame of the transmission sequence 212. The sequence allocator 208 of one communications node 102A-N may manage communications for the subset of the communications node 102A-N. For example, the sequence allocator 208 of the first communications node 102A or a designated master communications node 102A-N may generate and distribute the transmission sequence 212 to all the communications nodes 102A-N of the subset of communications nodes 102A-N.

In some embodiments, the sequence allocator 208 of one communications node 102A-N may negotiate with the sequence allocator 208 of a second communications node 102A-N to manage communications among respective subsets of communications nodes 102A-N. In some embodiments, in negotiating to manage communications among respective subsets of communications nodes 102A-N, the sequence allocator 208 of one communications node 102A-N and the sequence allocator 208 of the second communications nodes 102A-N may partition a total network capacity for the network 206 across the subsets of communications nodes 102A-N into one or more portions based on an expected number of packets to be transmitted and/or other factors (e.g., types and/or priority of data or content being communicated). For example, the expected number of packets to be transmitted by the first subset of communications nodes 102A-N may be greater than the expected number of packets to be transmitted by the second subset of communications nodes 102A-N. In this illustrative case, the sequence allocator 208 of the first communications node 102A may be allotted a first portion and the sequence allocator 208 of the second communications node 102B may be allotted a second portion of the total network capacity less than the first portion. Using the allotted portions, the sequence allocator 208 of the first communications node 102A may set the transmission length (or maximum transmission length) for the transmission sequence 212 accordingly. In some embodiments, a network capacity manager of the network and/or the sequence allocator 208 of one communications node 102A-N may assign one or more communications node 102A-N from one subset to another subset of communications nodes 102A-N.

The transceiver 204 may communicate or otherwise distribute the transmission sequence 212 to the other communications nodes 102A-N in the network 206. In some embodiments, the transceiver 204 may transmit the transmission sequence 212 to the other communications nodes 102A-N in the network 206, subsequent to the sequence allocator 208 generating the transmission sequence 212 or receiving the transmission sequence 212 from another communications node 102A-N. In some embodiments, the transceiver 204 may receive the transmission sequence 212 from one of the other communications nodes 102A-N in the network, subsequent to the other communications node 102A-N generating the transmission sequence 212 or receiving the transmission sequence 212 from yet another communications node 102A-N.

The transceiver 204 may transmit one or more packets to the other communications nodes 102A-N in the network in accordance with the transmission sequence 212. The transceiver 204 may receive one or more packets from the other communications nodes 102A-N in the network in accordance with the transmission sequence 212. Each of the one or more packets may be assigned a sequence number by the transceiver 204 or the sequence manager 210. The sequence number may indicate an order or a position within the one or more packets for transmission. The sequence number may be ascending or descending relative to the last packet in the one or more packets to be transmitted by the respective communications node 102A-N. For example, if there were three packets to be transmitted, the first packet to be transmitted may be labeled "3", the second packet "2", and the last packet "1".

The sequence manager 210 may transmit, via the transceiver 204, one or more packets to other communications nodes 102A-N in the network 206 in turn according to the transmission sequence 212. The sequence manager 210 may read or otherwise interpret the transmission sequence 212, responsive to receipt or generation of the transmission sequence 212. In some embodiments, the sequence manager 210 may determine or identify a position number of the respective communications node 102A-N from the order of transmission in the transmission sequence 212. The position number may indicate a position or a rank within the order of transmission of the transmission sequence 212 for the respective communications node 102A-N. In some embodiments, the sequence manager 210 may identify the transmission length for transmissions of one or more packets by the respective communications node 102A-N from the transmission sequence 212. In some embodiments, the sequence manager 210 may determine the number of one or more packets that the respective communications node 102A-N may transmit under the transmission length specified by the transmission sequence 212. In some embodiments, the sequence manager 210 may identify the total network capacity allotted to the subset to which the respective communications node 102A-N belongs to, from the transmission sequence 212.

The sequence manager 210 may detect a terminal packet of the one or more packets received via the transceiver 204 from another communications node 102A-N. The terminal packet may correspond to the last packet of the one or more packets transmitted by other communications node 102A-N. In some embodiments, the sequence manager 210 may detect that reception of the terminal packet by the transceiver 204 has or should have just completed according the transmission length specified in the transmission sequence 212 and/or information in the received packet(s), such as a token or identifier indicating an end-of-transmission or identifying the terminal packet. In some embodiments, the sequence manager 210 may detect, determine, or calculate a time of a final boundary of the terminal packet. The terminal offset may correspond to the time at which a signal of the terminal packet drops in magnitude. The sequence manager 210 may determine a completion of transmission from a prior communications node according to the absence of detected signals or of signals below a predetermined threshold signal level. In some embodiments, the sequence manager 210 may calculate the time of the final boundary of the terminal packet based on the transmission length specifying the maximum number of the one or more packets from the transmission sequence 212.

In some embodiments, the sequence manager 210 may identify the sequence number for each of the one or more packets received. In some embodiments, the sequence manager 210 may determine whether the sequence numbers between each of the one or more packets are increasing or decreasing. In some embodiments, and by way of a non-limiting example, the sequence manager 210 may determine whether the packet received from the other communications node 102A-N is the terminal packet based on the sequence number and/or the determination of whether the sequence numbers are increasing or decreasing. In some embodiments, if the sequence numbers are increasing, the sequence manager 210 may compare the sequence number of the received packet to the transmission length specifying the maximum number of packets to determine whether the received packet is the terminal packet. If the sequence number of the corresponding received packet is equal to the maximum number, the sequence manager 210 may determine that the corresponding received packet is the terminal packet. In some embodiments, if the sequence numbers of decreasing, the sequence manager 210 may compare the sequence number of the received packet to an initial index value (e.g., null or one) to determine whether the received packet is the terminal packet. If the sequence number is equal to the initial index value, the sequence manager 210 may determine that the corresponding received packet is the terminal packet. In some embodiments, the sequence manager 210 may determine that the received packet is a penultimate packet based on the sequence number and/or the determination of whether the sequence numbers are increasing or decreasing.

Immediately subsequent to detecting receipt of the terminal packet, the sequence manager 210 may initiate transmission of one or more packets, via the transceiver 204, to the other communications nodes 102A-N. As detailed above, each of the one or more packets may be assigned a sequence number. In some embodiments, the sequence manager 210 may initiate transmission of the one or more packets via the transceiver 204, subsequently to detecting that the reception of the terminal packet has or should have just completed. In some embodiments, the sequence manager 210 may transmit at least a first packet of the one or more packets, subsequent to detecting the receipt of the terminal packet. In some embodiments, the sequence manager 210 may preprocess or pre-buffer at least the first packet of the one or more packets, subsequent to detecting the penultimate packet and prior to detecting the terminal packet from one of the other communications nodes 102A-N. Subsequent to the transmission of the first packet, the sequence manager 210 may continue to transmit, via the transceiver 204, a remainder of the one or more packets to the other communications nodes 102A-N.

The transmission sequence 212 may be updated or modified repeatedly, periodically or dynamically. The sequence allocator 208 may be triggered (e.g., at a certain time or according to a particular condition) to determine an updated communications cost value for each pair of communications nodes 102A-N in the network 206. In some embodiments, the sequence allocator 208 may periodically determine the updated communications cost value for the corresponding pair of communications nodes 102A-N. In some embodiments, the sequence allocator 208 may determine, identify, or otherwise detect an onset of the transmission frame of the transmission sequence 212. The onset may include a time window shortly before a time of the transmission frame of the transmission sequence 212. In some embodiments, the sequence allocator 208 may determine an updated communication costs value, upon detecting the onset of the transmission frame of the transmission sequence 212. The sequence allocator 208 may determine the updated communications cost value for corresponding pairs of communications nodes 102A-N based on a subsequent change in, or addition and/or removal of at least one of the various factors for the corresponding pairs of communications node 102A-N discussed herein, for example at least one of the various factors used to determine the previous communications cost value. The various factors may include a propagation distance (e.g., distances 106, 108, and 110 of FIG. 1), a measured line-of-sight, a probability of line-of-sight, transmission strength, a receiver sensitivity, an altitude, SNR, or priority. In some embodiments, the sequence allocator 208 may identify a change in physical location of any of the communications nodes 102A-N. The sequence allocator 208 may generate an updated transmission sequence 212 based on the updated communications cost values for each pair of the communications nodes 102A-N. In addition, the functionalities of the communications nodes 102A-N, such as the sequence allocator 208, the sequence manager 210, the transmission sequence 212, and transceiver 204, may be repeated any number of times across the communications nodes 102A-N for instance.

Figure 4:
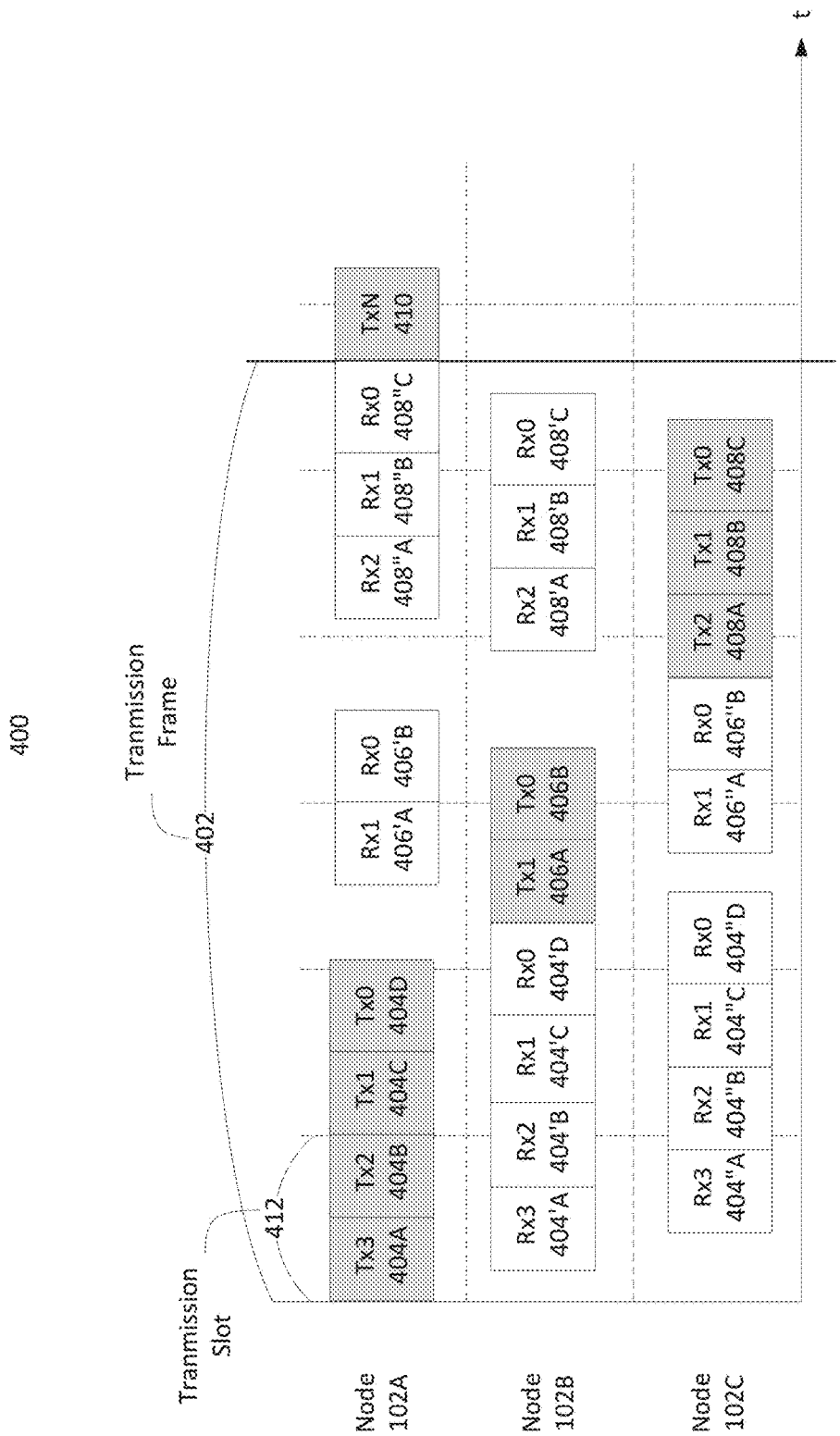
FIG. 4 shows a time graph of an example embodiment of a system for managing network communications, in accordance with some embodiments of the inventive concepts disclosed herein.

Referring now to FIG. 4, depicted is one illustrative embodiment of a time graph 400 with three communications nodes 102A-C transmitting and receiving one or more packets in accordance with the generated and distributed transmission sequence 212, in accordance with some embodiments of the inventive concepts disclosed herein. In the example depicted in FIG. 4, the transmission sequence 212 may specify that the first communications node 102A is to transmit packets first, followed by the second communications node 102B, and subsequently by the third communications node 102C. The transmission sequence 400 may have been generated by any one of the communications nodes 102A-C based on various factors, including physical distance, such as the relative distances 106, 108, and 110 depicted in FIG. 1. While transmitting, each of the three communications nodes 102A-C may assign sequence numbers to their respective packets in descending order from highest to zero for instance.

In accordance with the transmission sequence 212 in this non-limiting example, the first communications node 102A may transmit four packets 404A-D. In transmitting the packets, the first communications node 102A may assign the first packet 404A, the sequence number of "3"," the second packet 404B "2", the third packet 404C "1", and the fourth and terminal packet "0." The first communications node 102A may be more physically proximate to the second communications node 102B than to the third communications node 102C. Consequently, the time of arrival of the packets 404A-D may be shorter at the second communications node 102B than the third communications node 102C, as shown on the relative position in time of packets 404'A-D arriving at the second communications node 102B and of packets 404"A-D arriving at the third communications node 102C. After the first communications node 102A has completed transmitting packets 404A-D, the transmission sequence 212 may indicate that the second communication node 102B is to transmit packets next.

The second communications node 102B may detect 404'D as the terminal packet from the sequence number. Immediately after receipt of the fourth packet 404'D, the second communications node 102B may commence sequential transmission of two packets 406A and 406B, in accordance with the transmission sequence 212. The second communications node 102B may be more physically proximate to the first communications node 102A than to the third communications node 102C. As such, the time of arrival of the packets 406A and 406B may be shorter at the first communications node 102A than the third communications node 102C, as shown on the relative position in time of packets 406'A and 406'B arriving at the first communications node 102A and of packets 406"A and 406"B arriving at the third communications node 102C. After the second communications node 102B has completed transmitting packets 406A and 406B, the transmission sequence 212 may indicate that the third communication node 102C is to transmit packets next.

Similarly, the third communications node 102C may identify 406"B as the final packet of transmissions by the second communications node 102B using the sequence number in the packet. Immediately subsequent to receipt of the second packet 406"B, the third communications node 102C may initiate sequential transmission of for example three packets 408A-C to the first communications node 102A and the second communications node 102B. The third communications node 102C may be more physically proximate to the second communications node 102B than to the first communications node 102A. Therefore, the time of arrival of the packets 408A-C may be shorter at the second communications node 102B than the second communications node 102B, as shown on the relative position in time of packets 408'A-C arriving at the first communications node 102A and of packets 408"A-C arriving at the first communications node 102A. The transmission sequence 212 may be also repeated again so that the first communications node 102A transmits packet 410. In addition, at least one of the communication nodes 102A-C may generate a newly updated transmission sequence 212 for use by the communications nodes 102A-C.

This successive transmissions by the three communications node 102A-C may complete the illustrative transmission frame 402 of the transmission sequence 212. The transmission frame 402 of the transmission sequence 212 may allow more packets, and thus greater network capacity than the transmission slot 412 found in conventional TDMA implementations. Furthermore, in comparison to using the transmission slot 412, use of the transmission sequence 212 may reduce dead air time due to propagation time and may increase network capacity from actual use versus predicted or expected demand.

Now referring to FIG. 5, one embodiment of a method 500 of managing network communications is depicted. The functionalities of method 500 may be implemented by any of the computing devices and system architectures depicted in FIGS. 1 and 2. In brief summary, a transceiver of a first communications node of a plurality of communications nodes may receive, from a second communications node of the plurality of communications nodes, a transmission sequence generated according to a communications cost value determined for each pair of the communications nodes (502). The transmission sequence may specify a third communications node followed by the first communications node as consecutive nodes for transmitting packets. The transceiver may receive one or more packets transmitted by the third communications node according to the transmission sequence (504). The sequence manager may detect that reception of a terminal packet of the one or more packets from the third communications node has or should have just completed (506). The sequence manager may initiate transmission by the transceiver immediately upon the detection (508).

In further detail, referring now to step 502, and in some embodiments, a transceiver of a first communications node of a plurality of communications nodes may receive, from a second communications node of the plurality of communications nodes, a transmission sequence generated according to a communications cost value determined for each pair of the communications nodes. The transmission sequence may specify a third communications node followed by the first communications node as consecutive nodes for transmitting packets. For example, a sequence allocator 208 of the second communications node 102B may determine a communications cost value for each pair of the plurality of communications nodes 102A-N using any number of factors. The factors used to determine the communications cost value may include a propagation distance, a measured line-of-sight, a probability of line-of-sight, transmission strength, a receiver sensitivity, an altitude, SNR, or a priority for transmissions of packets by the respective communications node 102A-N. The sequence allocator 208 of the second communications node 102B may generate a transmission sequence 212 based on the communications cost value determined for each pair of the communications nodes 102A-N. The second communications node 102B may transmit the transmission sequence 212 to the first communications node 102A and to the third communications node 102C.

Referring now to step 504, and in some embodiments, the transceiver may receive one or more packets transmitted by the third communications node according to the transmission sequence. For example, in accordance with the distributed transmission sequence 212, the third communications node 102C may transmit one or more packets to the first communications node 102A and to the second communications node 102B. Each of the one or more packets transmitted by the third communications node 102C may be assigned or be associated with a sequence number indicating a position of the respective packet within the one or more packets. The sequence number may be ascending or descending relative to the last packet of the one or more packets transmitted.

Referring now to step 506, and in some embodiments, the sequence manager may detect that reception of a terminal packet of the one or more packets from the third communications node has or should have just completed. For example, as the first communications node 102A receives the one or more packets from the third communications node 102C, a sequence manager 210 of the first communications node 102A may identify the sequence number from each received packet. The sequence manager 210 may determine a most recently received packet as the terminal packet based on the sequence number and/or a transmission length specified in the transmission sequence 212.

Referring now to step 508, and in some embodiments, the sequence manager may initiate transmission by the transceiver immediately upon the detection. The sequence manager may initiate transmission by the transceiver immediately upon the detection, without waiting for a corresponding maximum transmission length to end. In some embodiments, and by way of illustration, upon determining that the first communications node 102A is to transmit in accordance with the transmission sequence 212, the sequence manager 210 of the first communications node 102A may pre-process and/or pre-load at least a first packet of the one or more packets to be transmitted to the plurality of the communications nodes 102A-N upon detecting the terminal packet. Once receipt of the terminal packet is completed, the sequence manager 210 may then commence transmitting of the one or more packets successively to the plurality of the communications nodes 102A-N. The sequence manager may initiate transmission of the first packet by the transceiver upon detecting reception of the terminal packet, so that the transmission of the first packet abuts the reception of the terminal packet in time, without any time gap or any significant time gap. In some embodiments, the first packet is transmitted after a short latency corresponding to a predetermined buffer or transition period. In some embodiments, the first packet is transmitted some amount of time after reception of the terminal packet, according to a specified hold-off period.

Further, the method 500 may include any of the operations disclosed throughout.

Referring now to FIGS. 6-10, exemplary graphs illustrating an exemplary network of nodes 102 of some embodiments are shown according to the inventive concepts disclosed herein. As shown in the graphs, each of the nodes #1-24 may be implemented as the node 102, as described and illustrated herein. As shown in the graphs, the different amplitudes of the transmissions indicates transmissions on different frequencies. The network of nodes may include a network reference node (e.g., one of 102A-102F). The network may be configured as a modified time TDMA network. The modified TDMA network may allow for one node (e.g., one of 102A-102F) of the network at a time for a given frequency to transmit to other nodes (e.g., 102A-F) of the network. The modified TDMA network may lack predefined synchronized slot boundaries that would otherwise define transmit allocation intervals for a typical TDMA network. The modified TDMA network may lack a predefined allocation of a number of slots for each node (e.g., 102A-F) per cycle. The modified TDMA may utilize a transmitted sequence indicating an order in which each node (e.g., 102A-F) of the network is to transmit. The modified TDMA may utilize packets each transmitted with a counter indicating a number of remaining packets from a particular node (e.g., one of 102A-102F). When the counter reaches a terminal value a subsequent node (e.g., one of 102A-102F) in the sequence may be allowed to transmit. The network reference node (e.g., one of 102A-102F) may include at least one processor 200 and a transceiver 204 communicatively coupled to the at least one processor 200. The processor 200 may be configured to collect data received from each other node (e.g., 102A-F) of the network during a data collection phase of a given modified TDMA cycle, the collected data including information of connectivity between pairs of nodes (e.g., 102A-F) of the network. The processor 200 may be further configured to output the collected data for transmission to each other node (e.g., 102A-F) of the network during a data distribution phase of the given modified TDMA cycle. The processor 200 may be further configured to perform any of the operations as disclosed throughout.

Figure 7:
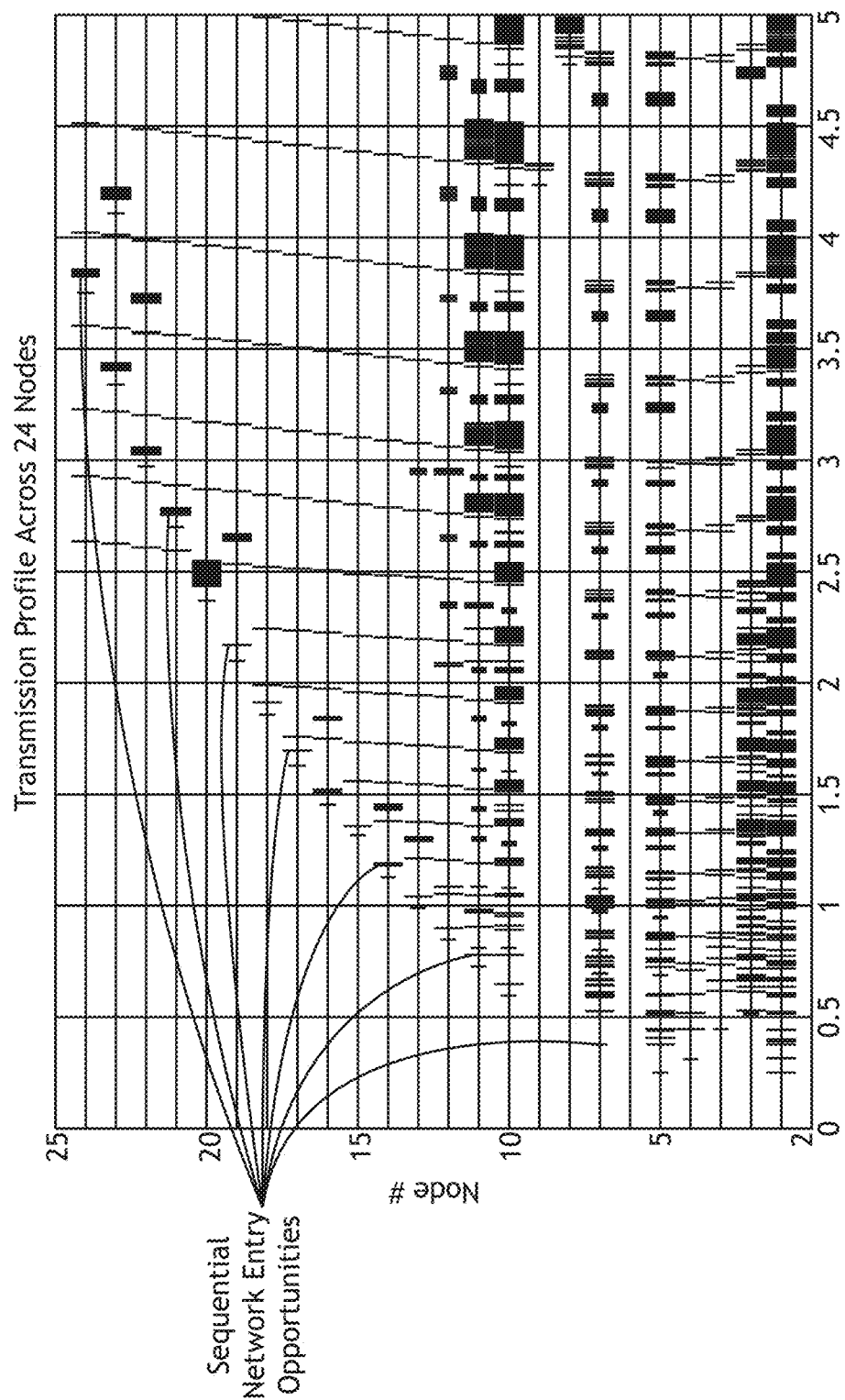
FIG. 7 is an exemplary graph illustrating network ingress of network entry nodes into the network of nodes according to inventive concepts disclosed herein.

Referring now to FIGS. 6-7, exemplary graphs illustrating network ingress of network entry nodes (e.g., node #6 in FIG. 6 and nodes #6-24 in FIG. 7) into the network of nodes (e.g., nodes #1-5 in FIG. 6 and nodes #1-5 in FIG. 7) of some embodiments are shown according to the inventive concepts disclosed herein. A network entry node may be a node that is not currently part of the network of nodes. In some embodiments, when a network entry node determines the transmitted sequence indicating the order in which each node of the network is to transmit, the network entry node may transmit to another node of the network to enter the network.

Referring now to FIG. 6, in some embodiments, when a network entry node #6 determines the transmitted sequence indicating the order in which each node of the network is to transmit, the network entry node #6 may be configured to enter the network by transmitting on a different frequency after one or more nodes (e.g., nodes #2, 4, and 5) of the network transmits a network message on a given frequency, the different frequency being different than the given frequency. By transmitting on the different frequency to other nodes of the network, the network entry node #6 may enter the network and be added to the transmitted sequence for the next modified TDMA cycle.

Referring now to FIG. 7, in some embodiments, each transmitted sequence may include at least one network entry slot at the end of the transmitted sequence for each modified TDMA cycle to allow for at least one network entry node (e.g., one or more of nodes #6-24) to enter the network per modified TDMA cycle. For example, each transmitted sequence may include one network entry slot at the end of the transmitted sequence for each modified TDMA cycle to allow for one network entry node (e.g., one or more of nodes #6-24) per modified TDMA cycle to enter the network. For example, a network entry node (e.g., node #6) may be configured to enter the network by transmitting to at least one other node (e.g., nodes #1-5) of the network during the network entry slot of the transmitted sequence. For example, as shown in FIG. 7, each of the network entry nodes #6-24 may sequentially enter the network one at a time per modified TDMA cycle. For example, where there are multiple network entry nodes #6-24, one of the entry nodes #6-24 is selected per modified TDMA cycle to enter the network.

Figure 8:
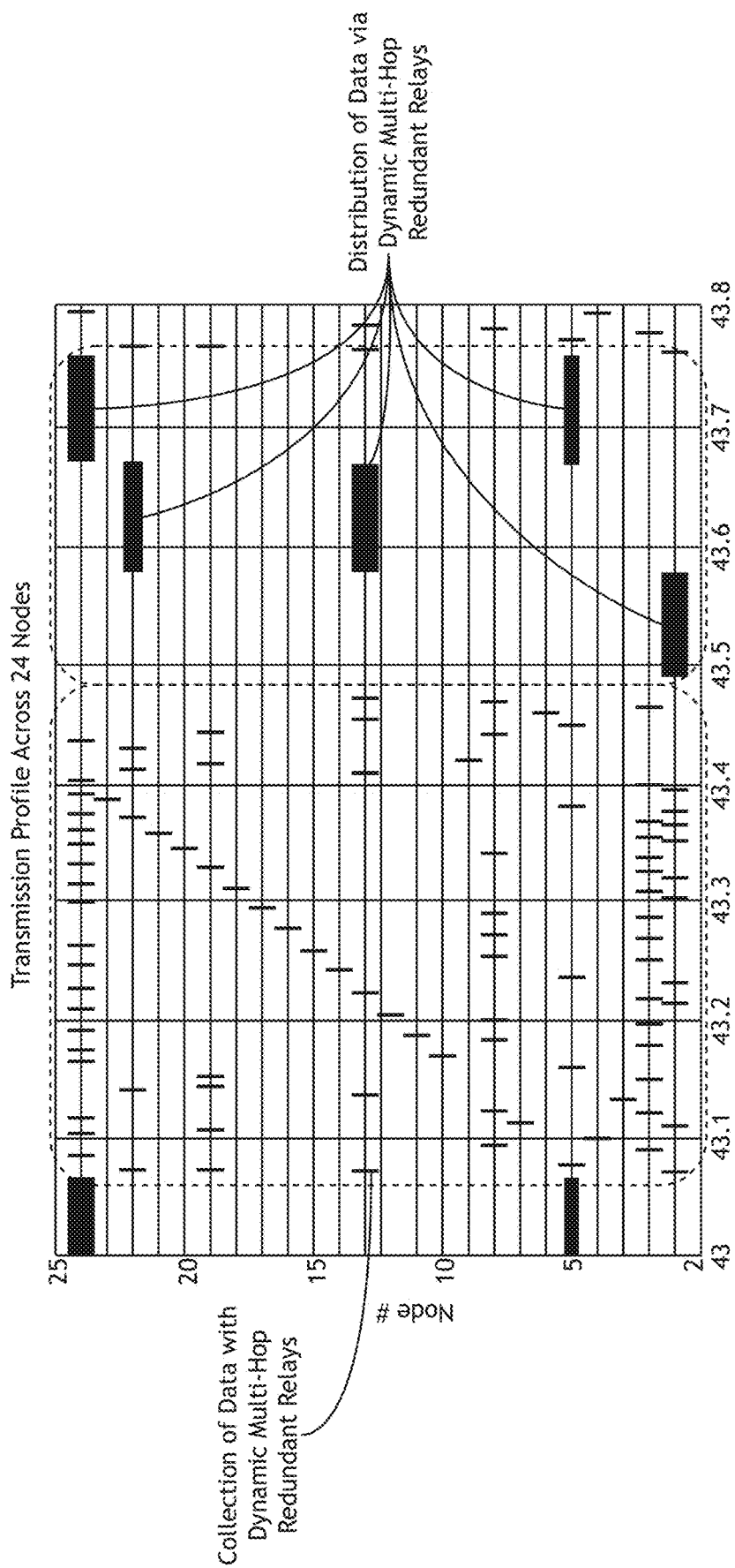
FIG. 8 is an exemplary graph illustrating a data collection phase and a data distribution phase of an exemplary modified TDMA cycle according to inventive concepts disclosed herein.

Referring now to FIG. 8, an exemplary graph illustrating a data collection phase and a data distribution phase of an exemplary modified TDMA cycle of some embodiments is shown according to the inventive concepts disclosed herein. During the data collection phase, the reference node may collect data received from each other node of the network. Some embodiments may include the use of relay hops (e.g., multiple redundant relay hops) to ensure the collection of data from all nodes of the network, and the collected data may include information of the relay hops. During the data distribution phase, the reference node may output the collected data for transmission to each other node of the network. Some embodiments may include the use of relay hops (e.g., multiple redundant relay hops) to ensure the distribution of the collected data to all nodes of the network. In some embodiments, the relay hops may be concurrent relay hops on different frequencies to reduce latency.

Figure 9:
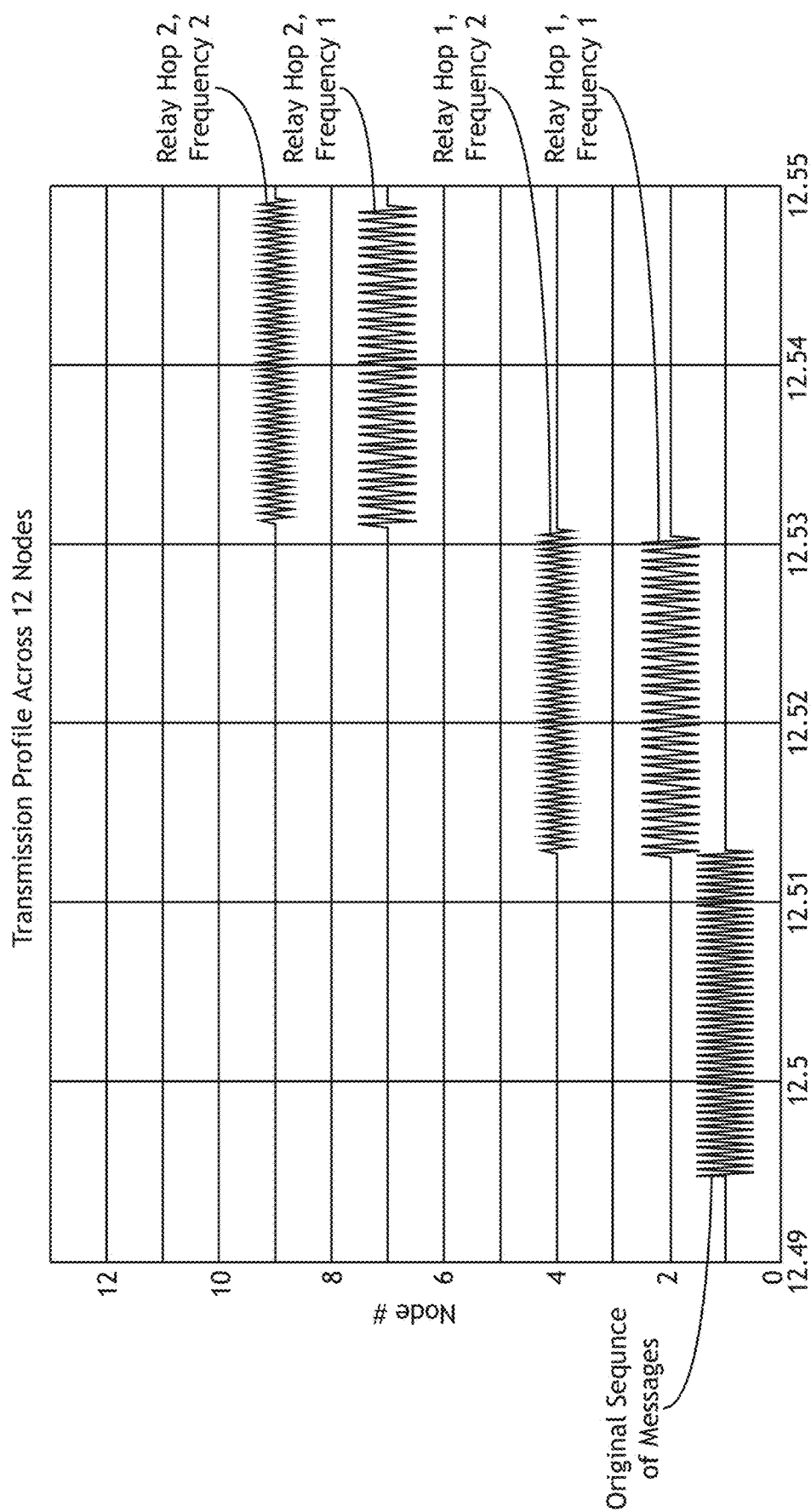
FIG. 9 is an exemplary graph illustrating relay hops according to inventive concepts disclosed herein.

Referring now to FIG. 9, an exemplary graph illustrating relay hops of some embodiments is shown according to the inventive concepts disclosed herein. In some embodiments, relay hops may be utilized during the data collection phase and/or the data distribution phase. For example, based on the collected data that each node has received during the data distribution phase, each node that needs to transmit a message may determine all necessary relay hops. In some embodiments, relay hops may be optimized to ensure redundant paths to one, multiple, or all other nodes. Relay hops may be performed upon reception of a string of packets from any given transmitter node. Further, in some embodiments, concurrent relay hops may be utilized with different transmission frequencies to reduce latency. As shown in FIG. 9, an original sequence of messages and two sets of concurrent relay hops are shown. Node #1 may transmit a sequence of messages. Node #2 may be a first relay hop on a first frequency, and node #4 may be a concurrent first relay hop on a second frequency. Node #7 may be a second relay hop on a first frequency, and node #9 may be a concurrent second relay hop on a second frequency.

Figure 10:
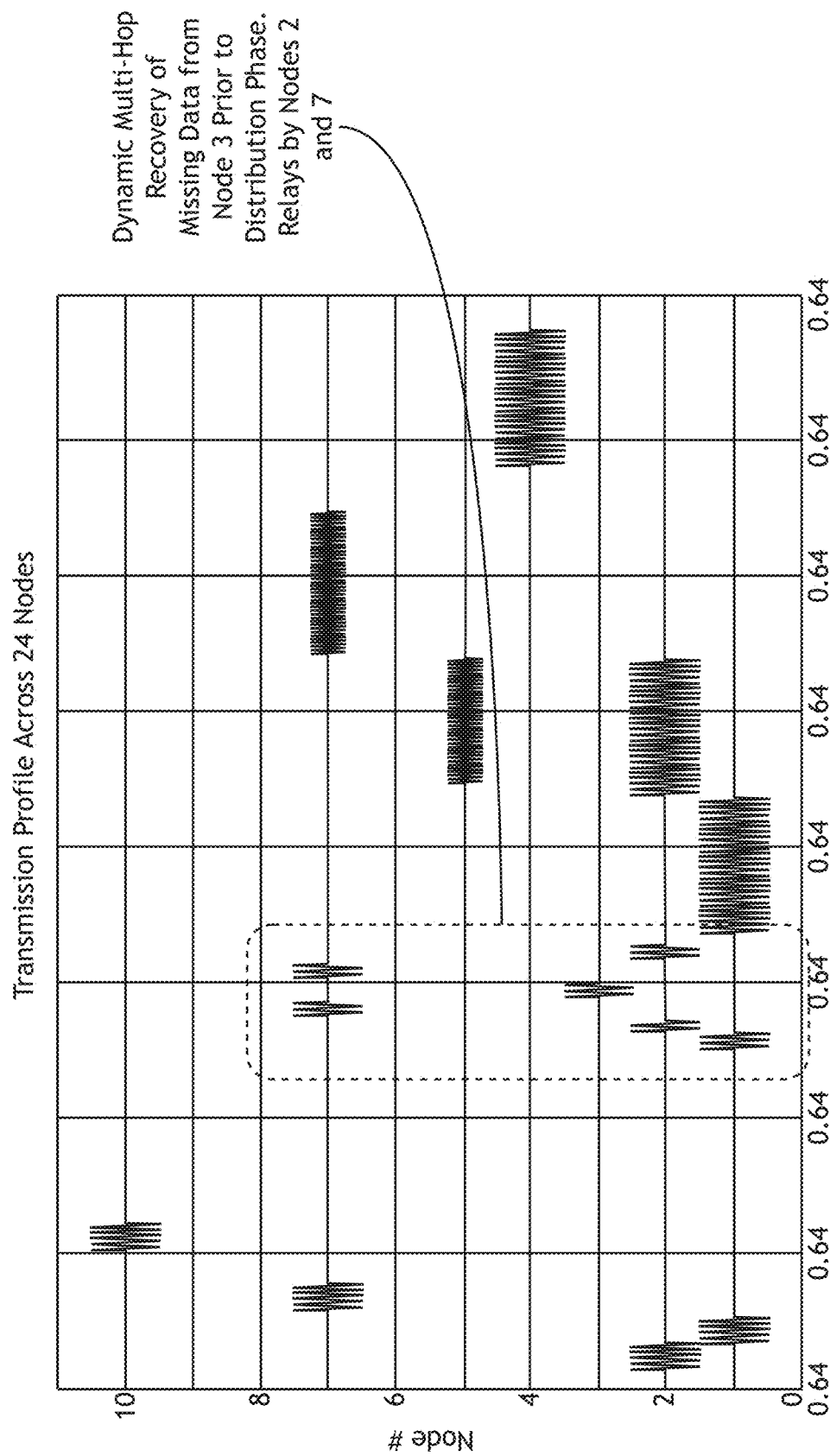
FIG. 10 is an exemplary graph illustrating recovery of missing data according to inventive concepts disclosed herein.

Referring now to FIG. 10, an exemplary graph illustrating recovery of missing data of some embodiments is shown according to the inventive concepts disclosed herein. In some embodiments, recovery of missing data may be initiated by a given node that determines that data is missing from a specific node based on the collected data, and the given node may determine that the node needs the missing data from the specific node. Because the reference node knows all nodes in the network and collects data from all nodes in the network and because this collected data is distributed to all nodes in the network, the given node can use the collected data to transmit a missed data message addressed to the specific node to retransmit the missed data such that the given node will receive the missed data from the specific node. In some embodiments, missed data may be some or all transmissions from the specific node. In some embodiments, a request for missed data may utilize relay hops (e.g., single-hop, multi-hop, single-frequency, and/or multi-frequency relay hops), and the relay hops may result in redundant paths to the addressee specific node. In some embodiments, in response to receiving the request for missing data, the specific node may retransmit the missing data. The retransmission may utilize relay hops (e.g., single-hop, multi-hop, single-frequency, multi-frequency, and recalculated relay hops), and the relay hops may result in redundant paths to the addressee given node.

Figure 11:
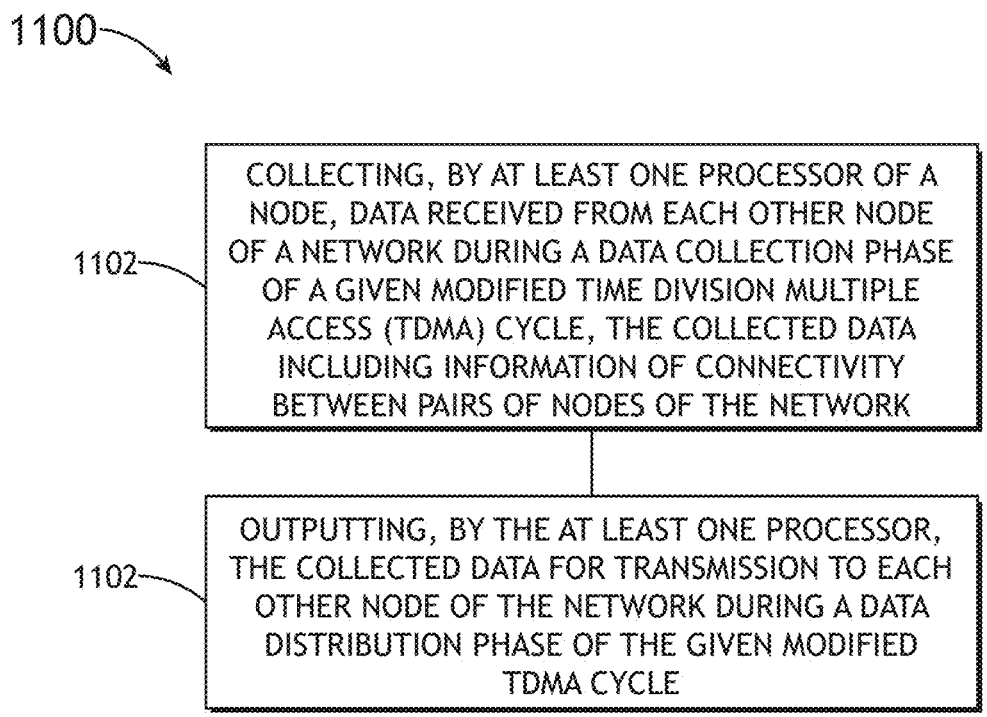
FIG. 11 is a diagram of an exemplary embodiment of a method according to the inventive concepts disclosed herein.

Referring now to FIG. 11, an exemplary embodiment of a method 1100 according to the inventive concepts disclosed herein may include one or more of the following steps. Additionally, for example, some embodiments may include performing one more instances of the method 1100 iteratively, concurrently, and/or sequentially.

A step 1102 may include collecting, by at least one processor of a node, data received from each other node of a network during a data collection phase of a given modified time division multiple access (TDMA) cycle, the collected data including information of connectivity between pairs of nodes of the network.

A step 1104 may include outputting, by the at least one processor, the collected data for transmission to each other node of the network during a data distribution phase of the given modified TDMA cycle.

Further, the method 1100 may include any of the operations disclosed throughout.

As will be appreciated from the above, embodiments of the inventive concepts disclosed herein may be directed to a method and a system including a node of a network configured to collect data of all other nodes in the network and distribute the collected data to all other nodes of the network.

As used throughout and as would be appreciated by those skilled in the art, "at least one non-transitory computer-readable medium" may refer to as at least one non-transitory computer-readable medium (e.g., memory 202; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for managing network communications, the system comprising:
    a node of a network of nodes, wherein the network is configured as a modified time division multiple access (TDMA) network, wherein the modified TDMA network allows for one node of the network at a time for a given frequency to transmit to other nodes of the network, wherein the modified TDMA network lacks predefined synchronized slot boundaries that would otherwise define transmit allocation intervals, wherein the modified TDMA network lacks a predefined allocation of a number of slots for each node per cycle, wherein the modified TDMA utilizes a transmitted sequence indicating an order in which each node of the network is to transmit, wherein the modified TDMA utilizes packets each transmitted with a counter indicating a number of remaining packets from a particular node, wherein when the counter reaches a terminal value a subsequent node in the sequence is allowed to transmit, wherein the node comprises at least one processor and a transceiver communicatively coupled to the at least one processor, wherein the at least one processor is configured to:
        collect data received from each other node of the network during a data collection phase of a given modified TDMA cycle, the collected data including information of connectivity between pairs of nodes of the network; and
        output the collected data for transmission to each other node of the network during a data distribution phase of the given modified TDMA cycle.
2. The system of claim 1, wherein the collected data further includes information of relay hops to the node.

3. The system of claim 2, wherein the relay hops include multiple redundant relay hops.

4. The system of claim 2, wherein at least one transmission during at least one of the data collection phase or the data distribution phase of the given modified TDMA cycle utilizes the relay hops.

5. The system of claim 4, wherein the relay hops include multiple redundant relay hops.

6. The system of claim 4, wherein the relay hops include the use of concurrent relay hops on different frequencies.

7. The system of claim 1, wherein the transmitted sequence includes a network entry slot at the end of the transmitted sequence, wherein a network entry node is configured to enter the network by transmitting to at least one other node of the network during the network entry slot.

8. The system of claim 7, wherein if there are multiple network entry nodes, only one network entry node is allowed to enter the network per modified TDMA cycle.

9. The system of claim 1, wherein a network entry node is configured to enter the network by transmitting on a different frequency after a given node of the network transmits a network message on a given frequency, the different frequency being different than the given frequency.

10. The system of claim 1, wherein a given node of the network is configured to: determine that the given node missed data from a specific node based on the collected data; transmit at least one missed data message addressed to the specific node to re-transmit the missed data; and receive the missed data from the specific node.

11. The system of claim 10, wherein transmission of the at least one missed data message utilizes at least one relay hop.

12. The system of claim 11, wherein the at least one relay hop includes multiple redundant relay hops.

13. The system of claim 1, wherein the node is a network reference node configured to collect connectivity information for each node of the network.

14. A method for managing network communications, the method comprising:
    collecting, by at least one processor of a node, data received from each other node of a network during a data collection phase of a given modified time division multiple access (TDMA) cycle, the collected data including information of connectivity between pairs of nodes of the network; and
    outputting, by the at least one processor, the collected data for transmission to each other node of the network during a data distribution phase of the given modified TDMA cycle,
    wherein the network is configured as a modified TDMA network, wherein the modified TDMA network allows for one node of the network at a time for a given frequency to transmit to other nodes of the network, wherein the modified TDMA network lacks predefined synchronized slot boundaries that would otherwise define transmit allocation intervals, wherein the modified TDMA network lacks a predefined allocation of a number of slots for each node per cycle, wherein the modified TDMA utilizes a transmitted sequence indicating an order in which each node of the network is to transmit, wherein the modified TDMA utilizes packets each transmitted with a counter indicating a number of remaining packets from a particular node, wherein when the counter reaches a terminal value a subsequent node in the sequence is allowed to transmit, wherein the node comprises the at least one processor and a transceiver communicatively coupled to the at least one processor.

15. The method of claim 14, wherein the collected data further includes information of relay hops to the node.

\* \* \* \* \*